United States Patent [19]
Herbert

[11] Patent Number: 5,174,788
[45] Date of Patent: Dec. 29, 1992

[54] FUSEBLOCK ADAPTER

[75] Inventor: William G. Herbert, Ellisville, Mo.

[73] Assignee: Cooper Industries, Inc., Houston, Tex.

[21] Appl. No.: 790,683

[22] Filed: Nov. 8, 1991

[51] Int. Cl.⁵ .......................................... H01R 13/73
[52] U.S. Cl. .................................... 439/532; 439/621
[58] Field of Search ............... 439/532, 540, 716, 717, 439/621, 622; 248/71, 121, 126; 403/348

[56] References Cited

U.S. PATENT DOCUMENTS

| | | | |
|---|---|---|---|
| 4,767,339 | 8/1988 | Comerci | 439/717 |
| 4,893,978 | 1/1990 | Frano | 403/348 |
| 5,090,922 | 2/1992 | Rymer et al. | 439/716 |

Primary Examiner—Gary F. Paumen
Attorney, Agent, or Firm—Laff, Whitesel, Conte & Saret

[57] ABSTRACT

A specially constructed fuseblock and rail mounting adapter are provided for mounting a fuseblock to a channel. The fuseblock comprises a base having an elongated slot opening therethrough and, on its bottom, a pair of flanges. The adapter comprises a fuseblock mounting side and a channel mounting side. The fuseblock mounting side has a top surface having a key and a pair of locking tabs extending therefrom. The key is adapted to be received by said elongated slot when said fuseblock and adapter are generally perpendicular to each other, and then, upon 90° rotation of the fuseblock relative to the adapter, lock with the elongated slot. The rotation of the fuseblock also causes each pair of locking tabs to engage one of said flanges. The channel mounting side is separately engageable with three different sized rails.

30 Claims, 4 Drawing Sheets

FUSEBLOCK ADAPTER

The invention relates generally to mounting fuseblocks and, more particularly, to a fuseblock and rail adapter, which are specially constructed to achieve secure mounting of the fuseblock to a rail.

BACKGROUND OF THE INVENTION

It is heretofore known to mount fuseblocks to channel members or rails, which are fastened by screws or the like to an underlying support such as a panel. Typically, the rails comprise a pair of upstanding edges, and the conventional method of mounting the fuseblock to the rails is to use a fuseblock having at its base front and back lips. The fuseblocks are mounted to the rails by aligning and engaging one of the fuseblock lips with one of the rail edges and then snapping the other edge into engagement.

It has also been known to use instead a specially constructed intermediary adapter to achieve the mounting of the fuseblock, which also may be specially constructed to engage with the adapter. In U.S. Pat. No. 4,767,339, for example, an adapter is provided having on its upper portion upstanding resilient fingers that terminate in latching surfaces, and a fuseblock is provided having a central opening in the form of an elongated slot. The fuseblock and adapter are secured together by aligning the elongated slot of the fuseblock with the fingers of the adapter and by then applying a pressure so that the resilient latching fingers enter the opening and then latch on to the top rim of the central opening. Leaves are also provided on the top of the adapter which act as cantilevered spring members to further secure the fuseholder to the latching fingers. It is also known to add to the top of the adapter of U.S. Pat. No. 4,767,339 a plurality of bosses and to the bottom of the fuseholder a plurality of bores adapted to receivingly engage the bosses to provide further securement between the two components.

The above described mounting method, however, fails to provide a secure and stabile mounting because of its reliance on resilient fingers which necessarily react in response to force in the direction axial to the latching fingers. This response provides "play" between the adapter and fuseblock and thus, an unstable mounting. Moreover, upon application of sufficient force, the two components can be separated.

Another problem with heretofore known fuseblocks is their lack of versatility in view of the fact that many different sized rail members may be encountered in connection with mounting fuseblocks. In order to attempt to overcome this problem, conventional fuseblocks and adapters have been constructed so as to be engagable with two different sized rails. The fuseblocks or the adapters have a constructed base that enables them to be engageable with two different-sized rails, as shown in FIGS. 4-7 of U.S. Pat. No. 4,767,339. Three arms extend generally downward from the base and are separately engageable with two different sized rails. Although this specially constructed base has increased versatility, there are more than two sizes of rails that can be used in connection with the mounting of fuseblocks.

SUMMARY OF THE INVENTION

Accordingly, it is an object of this invention to provide a specially constructed fuseblock and fuseblock adapter to achieve secure mounting of the fuseblock to the rail. It is a further object of the invention to provide such a fuseblock and adapter which are adapted to be locked together in a secure and stable manner. It is still further an objection of the invention to provide such an adapter that is adapted to be engageable with three different-sized rails.

In accordance with these objectives, a specially constructed fuseblock and adapter are provided for mounting the fuseblock to a rail. The fuseblock may be adapted to receive one or more fuses, and each fuseblock may, if desired, be adapted to engage with one or more adapters. The fuseblock comprises a base having a pair of end pieces and one or more fuse clips fastened to each end piece. Between each end piece is at least one central opening in the form of an elongated slot. On the bottom side of the fuseblock, extending generally perpendicular to the elongated slot on opposed sides of the slot is a pair of flanges or locking bars.

The adapter is a one piece plastic adapter having a fuseblock mounting side and a rail mounting side. The fuseblock mounting side has a flat surface and two pairs of locking tabs extending upward from the top of the flat surface. Between each pair of locking tabs is a key which also extends upward from the flat surface. The key is constructed so that it can be received by each elongated slot of the fuseblock only when the fuseblock and adapter are generally perpendicular to each other. By rotating the fuseblock approximately 90° relative to the adapter, the key locks with the central opening and each pair of locking tabs is adapted to straddle and lock with one of the flanges or locking bars on the bottom of the fuseholder. The fuseblock and adapter thus become locked together.

In addition, a configuration is provided on the channel mounting side so that the adapter is engageable with three different sized rails. The configuration comprises three downwardly extending arms, namely an intermediate arm and two flanking arms. The intermediate arm and one of the flanking arms have two latching surfaces integral therewith and the other flanking arm has one latching surface integral therewith. The four latching surfaces are constructed to be separately engageable with three different sized rails, preferably, a 15 mm rail, a 32 mm rail and a 35 mm rail, which are the commonly encountered rail sizes. In addition, a cantilever arm integral with one of the flanking arms is provided to aid in releasing the engaged rails.

If desired, the end pieces of the fuseblock may be interconnected by one or more corrugations in which case the elongated slot would be formed in at least one of the corrugations. The corrugation can take on any configuration, such as, for example, a quadrilateral prism element. In addition, with either embodiment, a pair of barriers may be formed on the end pieces which have a plurality of ribs integral therewith to provide additional surface cooling area. Preferably, the ribs extend upward perpendicular to the long axis of the fuseblock and may, if desired, be tapered. In addition, at least some of the bottom of the ribs extend into and may terminate at the end piece in a protuberance to provide more cooling surface area.

The foregoing invention and its advantages may be readily appreciated from the following detailed description of a preferred embodiment, when read in conjunction with the accompanying drawings:

DETAILED DESCRIPTION OF THE PREFERRED EMBODIMENTS

Figure 1:
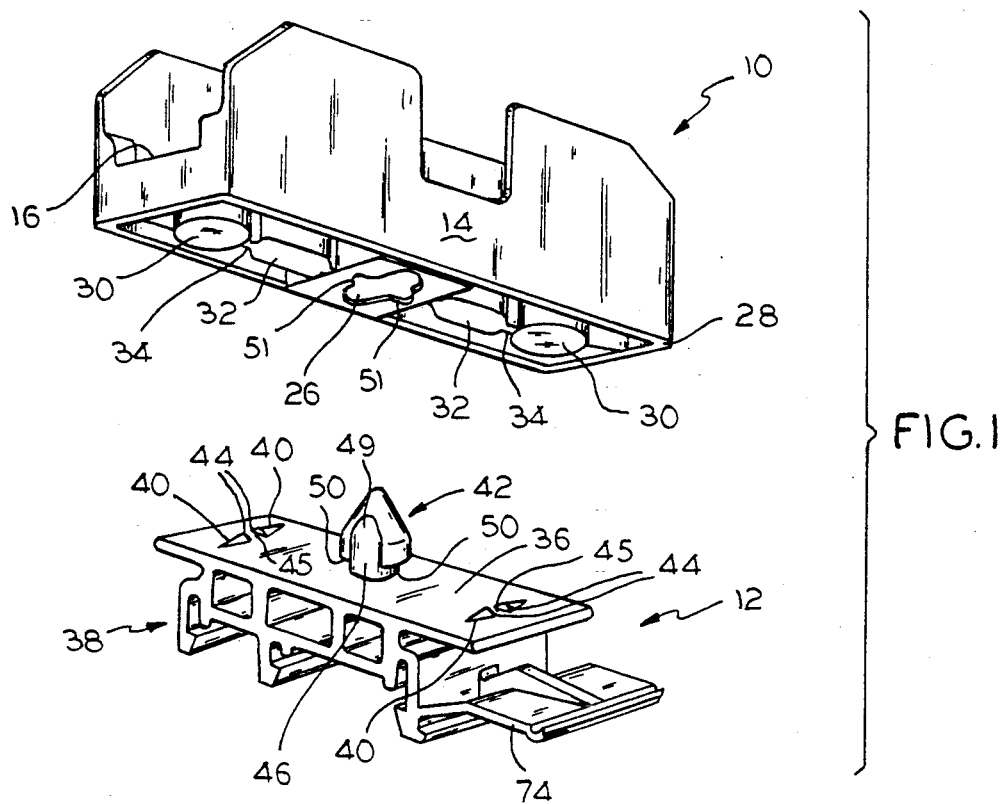
FIG. 1 is a perspective view of an adapter and a first embodiment of a fuseblock in accordance with the present invention, illustrating the two components prior to being joined and locked together.

A fuseblock 10 and rail adapter 12 in accordance with the invention are shown generally in FIG. 1-6. The fuseblock 10 comprises a base 14 having two ends, each end comprising an elevated top surface 16. A first bore 18 and a pair of second bore 20 are formed in each top surface to accommodate fasteners for mounting a fuse clip. A rail adapter mounting port 22 is formed between the elevated top surfaces 16 and comprises a first mating surface 24 and having an opening 26 formed therein. The opening 26 is in the form of an elongated slot extending preferably perpendicular to the long axis of the fuseblock 10 and a cylindrical fuse (not shown) that is to be mounted in the fuse block. The bottom of the fuseblock 10 comprises a peripheral lip 28, a pair of first substantially cylindrical bosses 30 which accommodate the first bores 18, and a pair of second elliptical bosses 32 which accommodate the second bores 20, respectively. A pair of flanges or locking bars 34 join the first and second bosses. Preferably, the fuseblock 10 and adapter 12 are constructed of a thermoplastic material.

As best shown in FIG. 1, the adapter 12 comprises generally a top fuseblock mounting surface 36 and a bottom rail mounting configuration 38. The fuseblock mounting surface 36 is a generally flat surface having formed thereon two pairs of spaced locking tabs 40 and an upwardly extending key 42 located between each pair of locking tabs. Each pair of locking tabs 40 has a pair of opposed triangular mating faces 44 separated by a gap 45. The mating faces 44 extend generally perpendicular to the surface 36 with the base of the triangle being on the surface 36. Preferably, the triangular, locking tabs extend perpendicular to the long axis of the fuseblock mounting surface 36.

The key 42 preferably has a generally cylindrical shaft base 46 and a head 48. The base of the head 48 has a bottom surface extending parallel to the long axis of the fuseblock mounting surface. The length of the head base is greater than the diameter of the shaft 46 to provide a pair of second mating surfaces 50 is formed on the head base. The base of the head extends generally parallel to the long axis of the fuse block mounting surface and is longitudinally aligned with a longitudinal center line passing through both gaps 45. Preferably, the width of the head 48 is slightly less than the width of shaft 46 thereby giving the appearance from the side that the head 48 extends into the shaft 46. Thus, on each side of the head 48 are formed a pair of curvatures 49. To accommodate the curvatures 49, elongated slot 26 would have a pair of complementary mating curvatures 51. The width of the slot 26 is preferably equal to or slightly larger than the width of the head 48 and less than the diameter of the shaft 46. Thus, the mating curvatures 51 act as a means to align the key in the slot 26 and thus lock the adapter onto the fuseblock as hereinafter set forth.

The head 48 is shown with an arrow head type configuration. The configuration, however, can be other than an arrow head. It would be possible to utilize a straight type head which can have any desired shape. An important feature of the present invention is to have a key-shaft 46 and head 48 which provide the appropriate mating surfaces 24 and 50 when turning the adapter 12 relative to the fuseblock 10.

Figure 2:
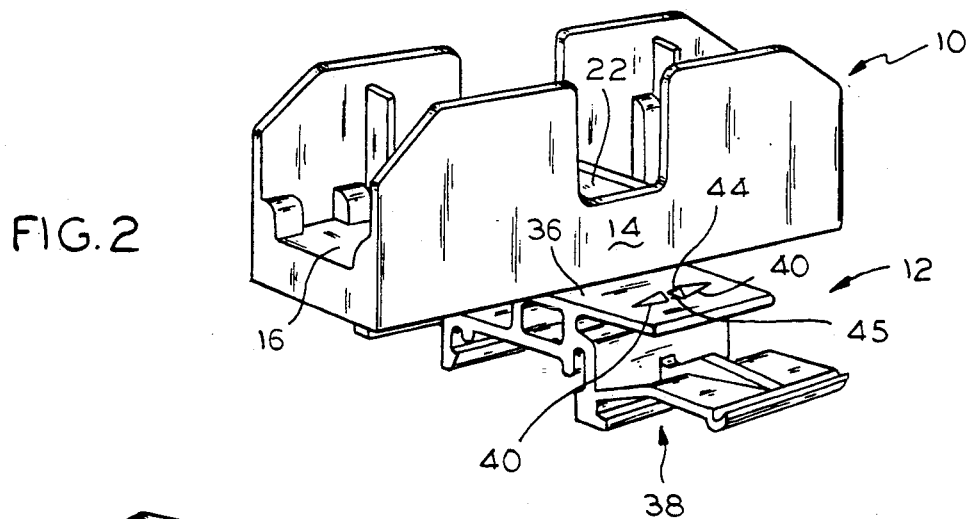
FIG. 2 is a perspective view of the adapter and fuseblock of FIG. 1, illustrating the first step in joining and locking together the two components.
Figure 3:
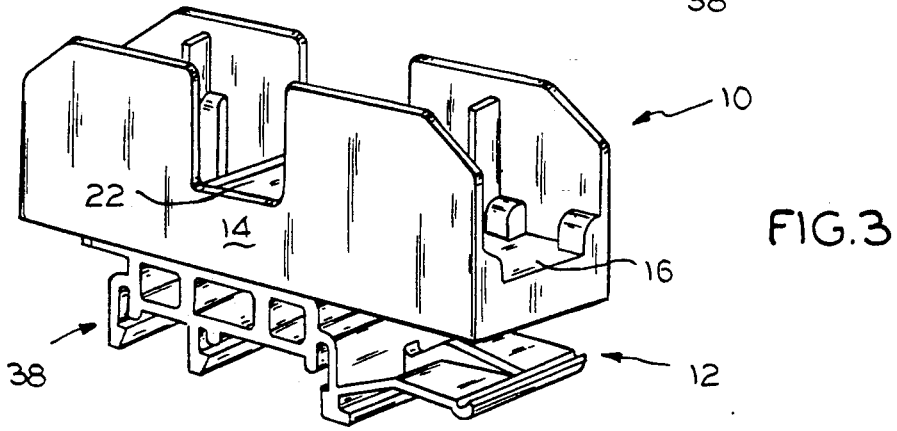
FIG. 3 is a perspective view of the fuseblock and adapter of FIGS. 1 and 2, illustrating the two components joined and locked together.
Figure 4:
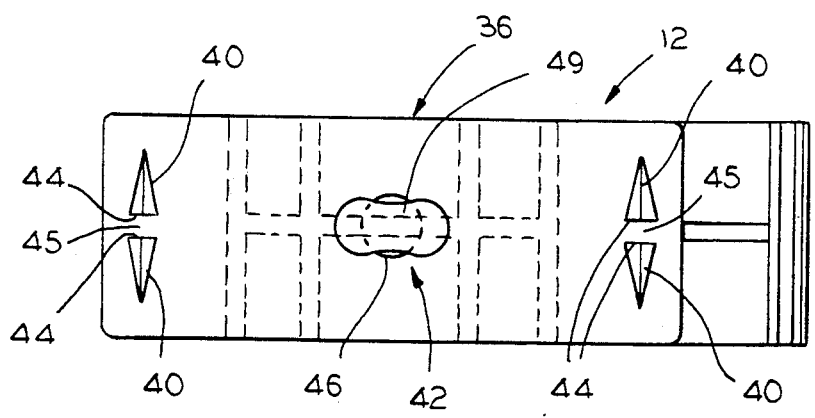
FIG. 4 is a top plan view of the adapter of FIGS. 1-3.

The fuseblock 10 and adapter 12 are joined together in accordance with the steps illustrated in FIGS. 1-3. As a result of the construction of elongated slot 26 and key 46, the elongated slot 26 can receive the key 42 when the fuseblock and adapter are substantially perpendicular to each other. Accordingly, the first step in joining the fuseblock and adapter is to align the components so that the shaft curvature 49 is aligned with the slot curvature 51 as shown in FIG. 1. The key shaft 46 is such that a center-line pushing through the shaft on the surface 36 also passes through the center of both locking gaps 45. Also, the distance between the surface 36 and the head bottom surface 50 is approximately equal or just slightly larger than the thickness of the slot 26. The width and length of the wall 24 is such to accommodate the head in the mounting port 22 when the arrow head base is parallel to or perpendicular to the axis of slot 26. The fuseblock and adapter are then joined together, as shown in FIG. 2, so that the key is received by the elongated slot 26, the curvature 52 engages the walls of shaft 46 and the base 36 engages the base of block 14. The fuseblock 10 and adapter 12 are then rotated as shown approximately 90° relative to each other, as shown in FIG. 3, which causes the key 42 to lock with the elongated slot and, thus, the first mating surface 24 of the fuseblock 10 is preferably close fitted with the second mating surface 50 of key 42. In addition, the rotation also causes each pair of locking tabs 40 to engage and lock onto the locking bars 34, the locking bars being located in the gap 45 between each opposed face 44. When the fuseblock 10 is locked onto adapter 12 as shown in FIG. 3, they are inseparable without breaking either the fuseblock 10 or the adapter 12.

A feature of the present invention as stated above is to have a locking action between the fuseblock 10 and adapter 12 by rotating them relative to each other. The preferred configuration is as shown. However, the amount of rotation could be less than 90° and is dependant on the relative size of the slot 26, the key 42, and the mating surfaces 24 and 50. For the configuration shown it is desirable to have a relative rotation of at least approximately 45°.

Figure 7:
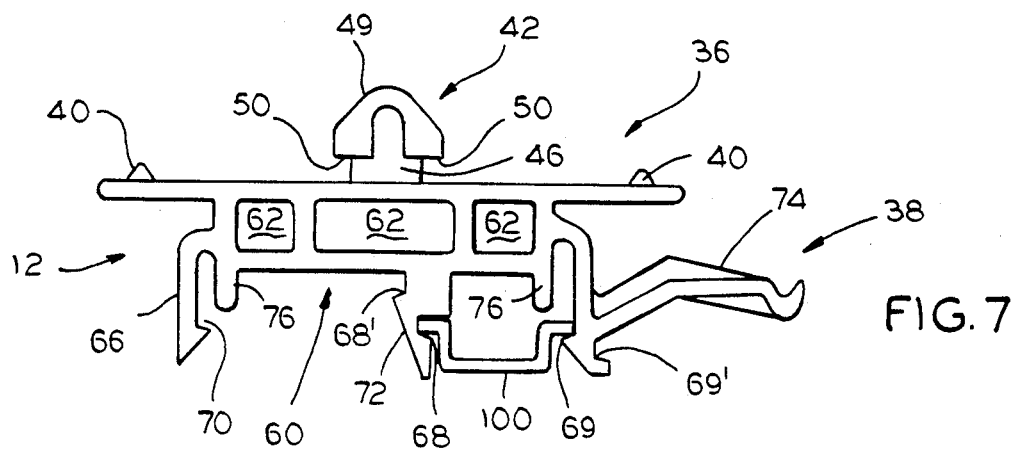
FIG. 7 is a side view of an adapter in accordance with the present invention being specially constructed to be separately engageable with three different-sized rails, illustrating the engagement of a 15 mm rail.
Figure 8:
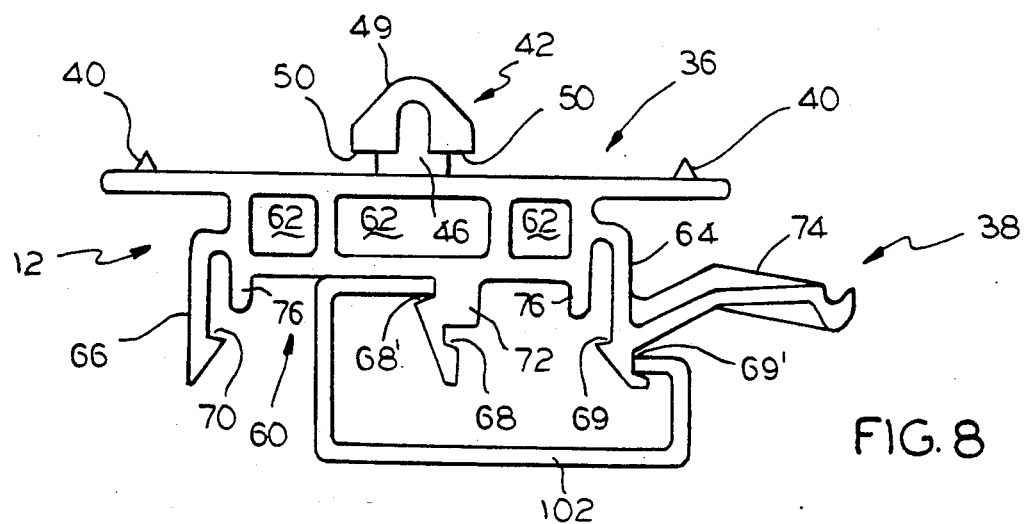
FIG. 8 is a side view of the adapter of FIG. 7, illustrating the engagement of a 32 mm rail.
Figure 9:
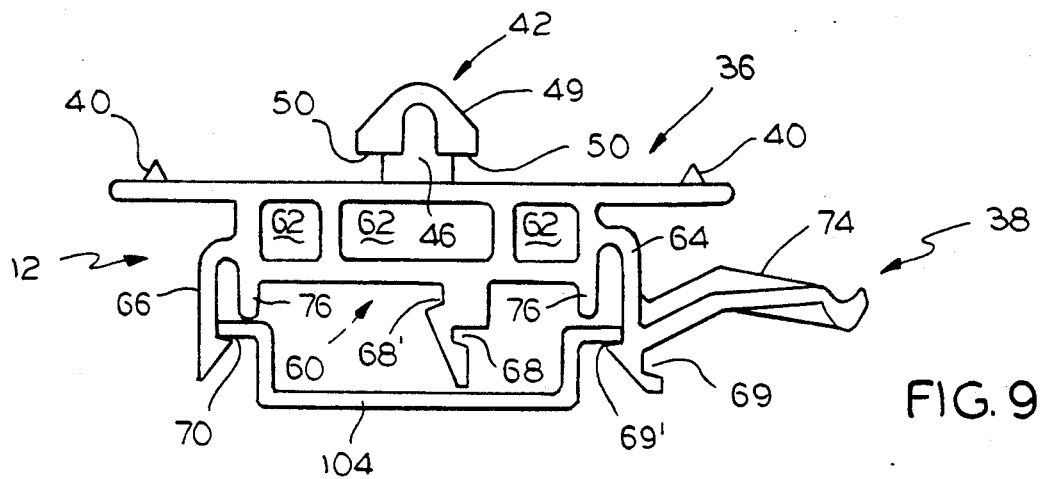
FIG. 9 is a side view of the adapter of FIG. 7, illustrating the engagement of a 35 mm rail.
Figure 10:
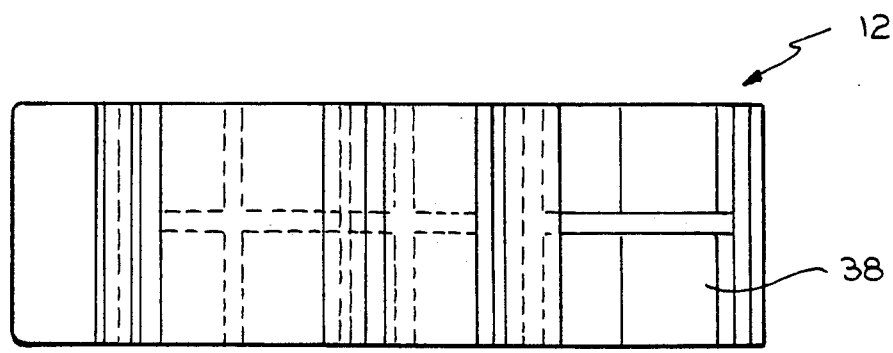
FIG. 10 is a bottom plan view of the adapter of FIGS. 7-9.

As shown in FIGS. 7-9, the one-piece rail mounting configuration 38 comprises a fortification 60 integral with the bottom of the fuseblock mounting surface. The fortification 60 contains a plurality of bores 62. The bores 62 reduce the amount of material needed to construct the adapter 12 and the total weight while maintaining the strength of the adapter.

A first flanking arm 64 having a width substantially equal to the width of the fortification 60 extends away and down from one end of the fortification at a point closer to the wall 38 than the bottom of the fortification 60. The first flanking arm 64 has an inwardly facing rail holding surface 69 on the inner face of the arm and an outwardly facing rail holding surface 69' on the outer face of the arm.

An intermediate arm 72 having a width substantially equal to the width of the adapter extends downward from the fortification. The arm 72 has an upper rail holding surface 68 facing a second flanking arm 66. The lower surface of the fortification 60 and the rail holding surface 68 generally form a first rail holding slot wherein a portion of the rail contacts part of the slot interior. (see FIG. 8). The arm 72 has near its end a second rail holding slot formed therein that faces the rail holding surface 69. The second rail holding slot has a lower rail holding surface 68' with the top surface of the second slot being in contact with a portion of the rail (see FIG. 7).

A second flanking arm 66 having a width equal to the width of the fortification 60 extends away and down from the other end of the fortification at a point closer to the bottom of the fortification 60 than the wall 38. The second arm 66 has near its end an inwardly facing rail holding surface 70. Both ends 76 of the fortification 60 extend downwardly, preferably perpendicular to the fortification bottom surface. The ends 76 terminate above the rail holding surfaces 69 and 70 and act as guide walls to form with the surfaces 69 and 70 rail holding slots wherein preferably a portion of the rail engages a portion of the rail holding slots formed by walls 76 and by both surfaces 69 and 70 as shown in FIG. 9.

The holding surfaces 68, 68', 69, 69' and 70 all decline from the respective surfaces of their arms 64, 72 and 76 at an angle of approximately 10° to 20° and preferably as shown, at an angle of 15°.

A cantilever arm 74 extends from a lower portion of the first flanking arm 64 and is adapted, upon application of upward pressure, to deflect the holding surface 69 and first flanking arm 64 away from the fortification 60, thereby providing a mechanism for effecting and releasing the engagement of the adapter 12 with any rail engaged by the latching surface 69. Downward pressure on the cantilever arm 74 releases the rail from holding surface 69' (see FIG. 8).

The rail mounting configuration 38 is adapted to be separately engageable with three different sized rails, as shown in FIGS. 7-9, the specific sizes of which can vary depending on the dimensions of the configuration. It is preferred, however, that the configuration be dimensioned so as to be engageable with three commonly used rails, i.e. the conventional 15 mm, 32 mm, and the 35 mm rails shown in FIGS. 7-9. In accordance with this preference, the dimension between the first flanking arm 64 and the facing side of the central arm should be approximately 14.5 mm so as to accommodate the conventional 15 mm rail 100 therebetween, as shown in FIG. 7. This dimension will also allow each other side of the central arm and first flanking arm 64 to accommodate the conventional 32 mm rail 102 configuration, as shown in FIG. 8. The dimension between the inwardly facing sides of the first and second flanking arms 64, 66 should be approximately 34.5 mm so as to accommodate the conventional 35 mm rail 104, as shown in FIG. 9.

The rail adapter shown in FIGS. 1-3 are provided to hold two rails and not the three rails shown in FIGS. 7-9. The adapter of FIGS. 1-3 would generally hold a conventional 35 mm and a 22-23 mm rail.

Figure 5:
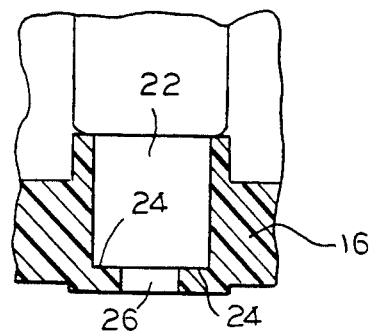
FIG. 5 is a partial broken cross section view along the center axis of the fuseblock of FIGS. 1-3, illustrating the mounting port.
Figure 6:
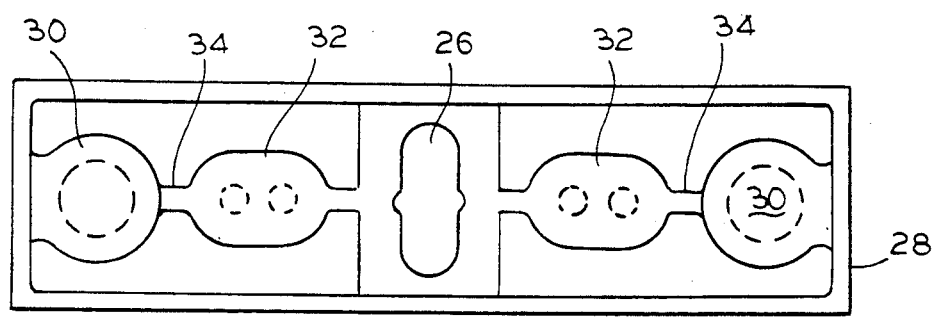
FIG. 6 is a bottom plan view of the fuseblock of FIGS. 1-3.

The fuseblock 10 in accordance with the present invention may have several different embodiments. For example, the fuseblock 10 may be adapted to receive a plurality of fuses as shown in FIGS. 5 and 6. In this regard, elevated top surfaces 16 each may have a plurality of first apertures 18 and a plurality of second apertures 20 so that a plurality of fuseclips (not shown) can be fastened 92 to the fuseblock. With this embodiment, the fuseblock may have a plurality of elongated slots 26 and, on its bottom, a plurality of flanges 36 so that the fuseblock 10 can be mounted to several adapters 12.

Figure 11:
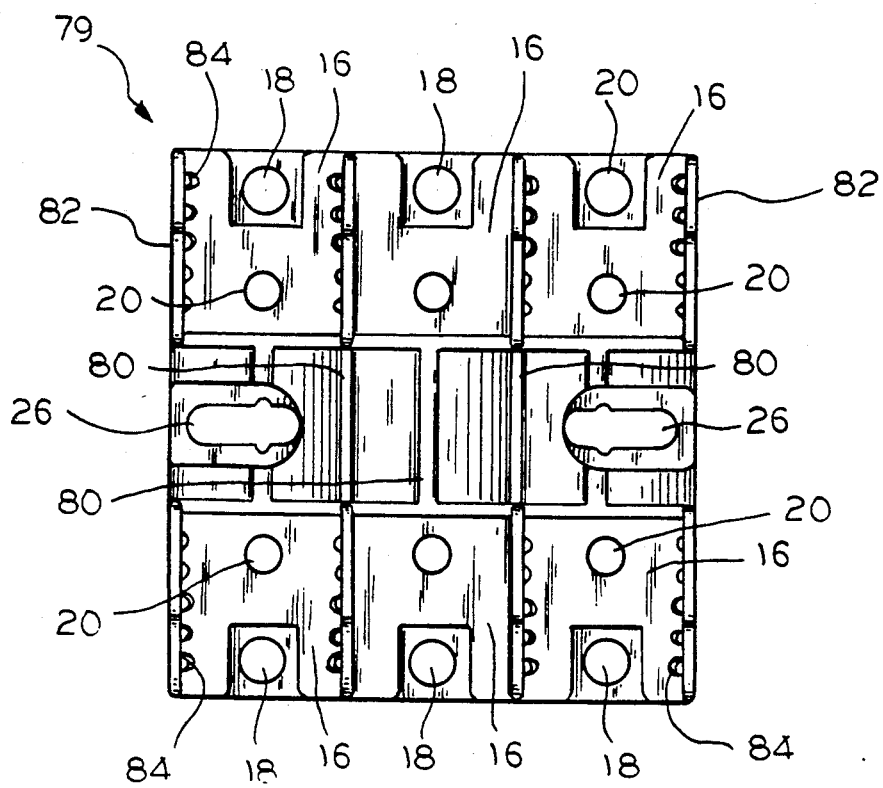
FIG. 11 is a top plan view of a second embodiment of the fuseblock in accordance with the invention.
Figure 12:
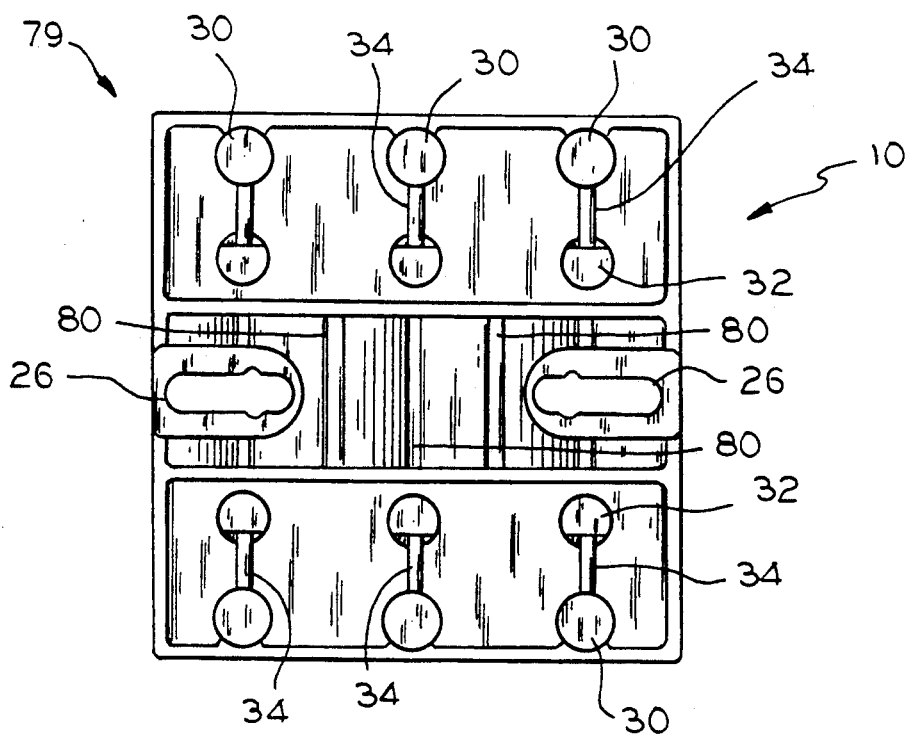
FIG. 12 is a bottom plan view of the fuseblock of FIG. 11.

Instead, a fuseblock 79 in accordance with FIGS. 11-12 may be used wherein the elevated top surfaces 16 may be joined together by one or more corrugations 80 that may take on any configuration, such as, for example, a quadrilateral prism. The one or more mounting ports 26 are therefore formed in the corrugation. The fuseblock may have one or more fuseclips (not shown) fastened thereto, and, thus, may be adapted to engage one or a plurality of cartridge-type fuses.

With any of the fuseblocks, if desired, a pair of barriers 82 can also be provided adjacent the first and second apertures. Desirably, the barriers 82 comprise a plurality of L-shaped ribs 84 which provide additional surface cooling area. The L-shaped ribs have their base integral with and extending into the fuseblock ends and their upwardly extending leg 84' extending from the base to the top of the barrier. The legs are substantially parallel with each other and the bases 84 on the barrier facing each other extend towards each other. The corrugated fuseblock of FIGS. 11-12 has two rail adapter mounting ports 26. However, it may have one, if desired, positioned in the central corrugation. The legs 84' as shown run parallel to the barriers 82 and may, if desired, be tapered and terminate at their bottoms in protuberances 86, as best shown in FIG. 11, to add additional surface cooling area.

Although our adapter has been illustrated as having an arrow head 48 having its base axis aligned with the center line passing through both gaps 45, an alternative (not shown) would be to have arrow head base axis perpendicular to the center line passing through both gaps 45 and the slot 26 would extend parallel to the longitudinal axis of the fuseblock.

The foregoing description is for purposes of illustration only and does not limit the scope of protection accorded this invention. The latter is to be measured by the following claims, which should be interpreted as broadly as the inventive contribution permits.

The invention claimed is:

1. A fuseblock adapter for mounting a fuseblock on a rail comprising:

a top and a bottom, said bottom having means to engage a rail, said top having a key means extending upwardly from said top, said key being adapted to pass through a slot in said fuseblock and to lock said adapter on said fuseblock when said key is turned relative to said fuseblock, said key comprising a cylindrical shaft terminating in an enlarged portion, further comprising at least one second means for locking the fuseblock on the adapter, wherein said enlarged portion is an arrow-head shaped portion having a base that is longer in length than the diameter of said shaft thereby defining a pair of mating surfaces adjacent the shaft, said mating surfaces engaging said fuseblock when said adapter is locked on said fuseblock, wherein said adapter is locked on said fuseblock when said key is turned at least 45 degrees, wherein each said second locking means is a pair of spaced locking tabs.

2. The adapter of claim 1 wherein said adapter has two said second locking means formed on the top.

3. The adapter of claim 2 wherein said two second locking means are two pairs of locking tabs with each pair having opposed spaced mating faces, defining a gap adapted to receive a lock bar formed on the bottom of said fuseblock.

4. The adapter of claim 1 wherein said rail engaging means is separately engageable with three different sized rails.

5. A fuseblock adapter for mounting a fuseblock on a rail comprising:

a top and a bottom, said bottom having means to engage a rail, said top having a key means extending upwardly from said top, said key being adapted to pass through a slot in said fuseblock and to lock said adapter on said fuseblock when said key is turned relative to said fuseblock, said key comprising a cylindrical shaft terminating in an enlarged portion, further comprising at least one second means for locking the fuseblock on the adapter, wherein said enlarged portion is an arrow-head shaped portion having a base that is longer in length than the diameter of said shaft thereby defining a pair of mating surfaces adjacent the shaft, said mating surfaces engaging said fuseblock when said adapter is locked on said fuseblock, wherein said adapter is locked on said fuseblock when said key is turned at least 45 degrees, wherein said rail engaging means is separately engageable with three different sized rails, and wherein said rail engaging means comprises first and second flanking arms and an intermediate third arm, said first flanking arm having a pair of oppositely-facing first latching surfaces, said second flanking arm having an inwardly-facing second latching surface, and said central arm having a pair of oppositely-facing third latching surfaces, said first, second and third latching surfaces being engageable with the end of at least one of said three different sized rails.

6. The adapter of claim 5 wherein a cantilever arm is mounted to said first flanking arm, said cantilever arm adapted to deflect said first flanking arm upon application of pressure to assist in the engagement and disengagement of any rail engagable with one of said first latching surfaces.

7. The adapter of claim 6 wherein said rail engaging means is separately engageable with conventional 15 mm, 32 mm, and 35 mm rails.

8. The adapter of claim 7 wherein the 15 mm rail is engageable with one of said first latching surfaces and one of said third latching surfaces, the 32 mm rail is engageable with the other of said first latching surfaces and the other of said third latching surfaces, the 35 mm rail is engageable with said one of said first latching surfaces and said second latching surface, and said rail engaging means further comprises a first guiding wall adjacent said first flanking arm and a second guiding wall adjacent said flanking arm.

9. A one piece thermoplastic fuseblock adapter for mounting a fuseblock on a rail comprising:

a generally flat top surface, a first pair of tabs extending upwardly from the top surface adjacent one end thereof, a first second pair of tabs extending upwardly from the top surface adjacent the other end thereof, each pair of tabs having opposed spaced mating faces defining a gap to receive a lock means on a bottom of said fuseblock, a key extending upwardly from said top surface between said first and second pair of tabs, said key having a cylindrical shaft extending from said top surface and terminating in an enlarged top end portion, a center line passing through said first and second gaps also passing through said key shaft, a fortification means extending from and formed under said top surface and having two ends and a bottom, first and second arms extending away and down from each end of said fortification, a guide arm extending from the bottom of said fortification contiguous with each fortification end, a third arm extending downwardly from the bottom of said fortification between said first and second arms, a cantilever arm extending from said first arm to flex said first arm, said first arm having a pair of oppositely facing rail latching surfaces, said third arm having a pair of oppositely facing rail latching surfaces, said second arm having one rail latching surface facing said third arm, said rail latching surfaces and arms being sized to latch thereon three different sized rails.

10. The adapter of claim 9 wherein the key has an arrow head shaped end wherein the base of the arrow head is longer than the diameter of the shaft and the shaft extends into the arrow head and the shaft has a diameter greater than the width of the arrow head.

11. A system for mounting a fuseblock on a rail comprising:

a fuseblock adapted to engage at least one fuse, said fuseblock having a base and a least one adapter mounting opening therethrough; and at least one adapter having on the bottom thereof means for engaging the rail, a key extending from the top of the adapter, said key and adapter opening being configured to permit said key to be received by said opening, whereby when said key and adapter are rotated relative to the fuseblock said adapter and fuseblock are locked together.

12. The mounting system of claim 11 wherein said opening is adapted to receive said key only when said fuseblock and adapter are at an angle relative to each other and wherein, upon subsequent rotation of the fuseblock relative to the adapter, the key becomes locked in said opening.

13. The mounting system of claim 11 wherein said key comprises a shaft terminating in an arrow-shaped portion and said opening is an elongated slot.

14. The mounting system of claim 12 wherein said base comprises a pair of first mating surfaces adjacent said elongated slot and wherein said key has a shaft and an elongated keyhead with a keyhead base that is longer in length than the diameter of said shaft thereby defining a pair of second mating surfaces adjacent the shaft, said first mating surfaces mating with said second mating surfaces when said key is locked within said elongated slot.

15. The mounting system of claim 12 wherein said angle is approximately 90°.

16. The mounting system of claim 11 wherein said adapter has second means for engaging the fuseblock.

17. The mounting system of claim 16 wherein said fuseblock has at least one lock means formed on the bottom of said base, said second fuseblock engaging means comprising means for engaging said lock means.

18. The mounting system of claim 17 wherein said fuseblock engaging means comprises at least one pair of locking tabs.

19. The mounting system of claim 18 wherein said at least one pair of locking tabs comprises a pair of gradually elevating triangular elements that terminate in opposed triangular mating faces, thereby defining a gap adapted to receive said at least one flange formed on the bottom of said fuseblock.

20. The mounting system of claim 19 wherein said at least one flange extends perpendicular to said tabs when said flange is received by said gap.

21. The mounting system of claim 20 wherein there are two flanges and two pairs of said locking tabs, said opening being located between said two flanges and said key being located between said two pairs of locking tabs.

22. The mounting system of claim 21 wherein said opening is adapted to receive said key only when said fuseblock and adapter are at a predetermined angle relative to each other and wherein, upon subsequent rotation of the fuseblock relative to the adapter, the key becomes locked in said opening.

23. The mounting system of claim 22 wherein said key comprises a shaft terminating in an arrow head inserted in said shaft and said opening is an elongated slot having an alignment curvature sized to receive said arrow shaft.

24. The mounting system of claim 23 wherein said base comprises a pair of first mating surfaces adjacent said elongated slot and wherein said arrow shaped portion has a base that is longer in length than the diameter of said shaft thereby defining a pair of second mating surfaces adjacent the shaft, said first mating surfaces mating with said second mating surfaces when said key is locked within said elongated slot, and said elongated slot having a width equal to or slightly larger than the width of said arrow head and said slot width being less than the diameter of said shaft.

25. The mounting system of claim 16 wherein there are at least two mounting bosses on each end of said fuseblock and a lock bar on the bottom of said fuse interconnecting each of said two bosses on each end of said fuseblock.

26. The mounting system of claim 25 wherein said rail engaging means is separately engageable with three different sized rails.

27. The mounting system of claim 26 wherein said rail engaging means comprises first and second flanking arms and a central arm, said first flanking arm having a pair of oppositely-facing first latching surfaces, said second flanking arm having an inwardly-facing second latching surface, and said central arm having a pair of oppositely-facing third latching surfaces, said first, second and third latching surfaces being engageable with the end of at least one of said three different sized rails.

28. The mounting system of claim 27 wherein a cantilever arm is mounted to said first flanking arm, said cantilever arm adapter to deflect said first flanking arm upon application of pressure to assist in the engagement and disengagement of any rail engagable with one of said first latching surfaces.

29. The mounting system of claim 28 wherein said adapter is a one-piece thermoplastic adapter having a fortification mounted thereto, said first and second flanking arms and said central arm being integral with said fortification.

30. The mounting system of claim 29 wherein said rail engaging means is separately engagable with conventional 15 mm, 32 mm, and 35 mm rails.

* * * * *